(12) United States Patent
Dixon et al.

(10) Patent No.: US 7,462,279 B2
(45) Date of Patent: Dec. 9, 2008

(54) WATERWAYS LIME SPREADER

(76) Inventors: James Gilder Dixon, 1208 Mount Marsh Road, Whiporie, New South Wales, 2469 (AU); Jason Ian Nathaniel Beath, 8 Apia Avenue, Clear Island Waters, Queensland, 4226 (AU)

( * ) Notice: Subject to any disclaimer, the term of this patent is extended or adjusted under 35 U.S.C. 154(b) by 360 days.

(21) Appl. No.: 10/543,158

(22) PCT Filed: Jan. 31, 2003

(86) PCT No.: PCT/AU03/00094

§ 371 (c)(1),
(2), (4) Date: Jul. 25, 2005

(87) PCT Pub. No.: WO2004/067455

PCT Pub. Date: Aug. 12, 2004

(65) Prior Publication Data

US 2006/0144798 A1    Jul. 6, 2006

(51) Int. Cl.
*C02F 1/66* (2006.01)

(52) U.S. Cl. ............... 210/170.09; 210/192; 210/198.1; 210/205; 241/27; 241/70; 241/91

(58) Field of Classification Search .................. 210/192
See application file for complete search history.

(56) References Cited

U.S. PATENT DOCUMENTS

| | | | |
|---|---|---|---|
| 2,546,317 A * | 3/1951 | Prizer | 47/48.5 |
| 3,848,815 A * | 11/1974 | Carpenter et al. | 241/74 |
| 4,961,519 A | 10/1990 | Strandberg | |
| 5,089,120 A * | 2/1992 | Eberhardt | 210/170.05 |
| 5,702,614 A * | 12/1997 | Taylor | 210/738 |

FOREIGN PATENT DOCUMENTS

| | | |
|---|---|---|
| DE | 19933181 A | 2/2001 |
| GB | 2 139 569 A | 11/1984 |
| SE | 8704086 | 4/1989 |

\* cited by examiner

*Primary Examiner*—Peter A. Hruskoci
(74) *Attorney, Agent, or Firm*—Finnegan, Henderson, Farabow, Garrett & Dunner, LLP.

(57) ABSTRACT

Apparatus (10) for treating a waterway having low pH and containing metals such as aluminium in solution, as a result of runoff from acid sulphate soils, is capable of dosing the waterway with a variety of reagents, to bring the metals out of solution and to achieve a neutral pH. The apparatus (10) includes a rotating drum tumbler (14) having a cylindrical drum (52) which, as it rotates, causes limestone rock to abrade to produce particles of calcium carbonate with which the waterway may be dosed. The inner surface of the drum (52) is provided with an abrasive surface (68) which contacts rock pieces (74) and transports them within the drum (52) as the drum (52) rotates, and with guide vanes (72) which contact and deflect the rock pieces (74), causing the rock pieces (74) to abrade each other. Other reagents in liquid and/or powder form may also be dispensed.

12 Claims, 5 Drawing Sheets

WATERWAYS LIME SPREADER

This invention relates to a method and apparatus for treating waterways, watercourses and disturbed soils affected by the runoff from acid sulphate soils, and for general pH correction.

As described by Mitch Tulau in a paper entitled "Management of Acid Sulphate Soils in New South Wales—Policy, Organisation, and Regulation" in *The Australasian Journal of Natural Resources Law and Policy*, Vol. 6, No. 1, 1999, acid sulphate soils (ASS) are sediments deposited under estuarine conditions, that is, close to sea level, which sediments contain the sulphidic mineral pyrite (iron disulphide, $FeS_2$). In Australia, the ASS of most concern are those formed within the past 10,000 years, after the last major sea level rise. When the sea level rose and inundated land, sulphate in the seawater mixed with land sediments containing iron oxides and organic matter. The resulting chemical reaction produced large quantities of iron sulphides. It is estimated that there are two million hectares of acid sulphate soils in Australia containing approximately one billion tonnes of iron sulphides.

As long as acid sulphate soils are not disturbed or drained, they are relatively harmless and are termed 'potential ASS (PASS)', because the pyrites are contained within a layer of waterlogged soil. However, if the sediments are exposed to air, the pyrite is oxidised, and sulphuric acid is generated. One tonne of iron sulphide can produce about 1.5 tonnes of sulphuric acid. As a result of the generation of sulphuric acid, soil acidity (pH) may fall to below 4, at which level elements such as iron, arsenic and aluminium become soluble in toxic quantities, and their precipitates affect water quality. Runoff from acid sulphate soils into watercourses and waterways can have disastrous consequences: massive kills of aquatic life can occur due to low pH and aluminium toxicity. Chronic effects on aquatic systems are common and widespread and include habitat degradation, altered waterplant communities, weed invasions by acid-tolerant plants, secondary water quality changes, the presence of disease, reduced aquatic food resources, reduced migration potential of fish, and reduced recruitment, survival and growth rates across a wide range of aquatic species.

ASS areas are generally degraded backswamp wetlands. Acid sulphate soils in such areas have historically been activated by drainage of potential ASS areas for conversion to agricultural land. Clearance in 1972 of 700 ha of mangrove swamp within sight of the city of Cairns in North Queensland, resulted, by 1999, in the daily release of the equivalent of a "small swimming pool" of sulphuric acid into the ocean.

More recently, disturbance of acid sulphate soils is more likely to result from development of ASS areas for residential, commercial and entertainment use. Many of the coastal areas of New South Wales and Queensland which are subject to the pressures of development are ASS areas: 60,000 hectares of ASS have been identified in south-east Queensland alone. The Commonwealth Government, State and Local governments in Queensland and New South Wales, and agri-business, have become aware of decreasing water quality on the Gold Coast/Tweed coastal strip, which has been identified by academic study as being caused by acid sulphate runoff resulting from urban development, agricultural development and natural development. The runoff is a major pollution problem, as described earlier in this specification, causing serious fish kills as was seen in the aftermath of the Lismore and Grafton floods in early 2001.

The policy of the Queensland Government is to minimise the disturbance of acid sulphate soils, and to manage the effects of any disturbance such that the long-term economic and environmental impacts are minimised. As acid sulphate soil runoff is already occurring in locations such as Queensland's Gold Coast, and in northern New South Wales, and as development of ASS areas in at leats those States will continue, an effective and economical system, for ameliorating the effects of such runoff on waterways and watercourses, is required.

It is an object of this invention to provide a method and apparatus for treating waterways and watercourses to ameliorate the effects of runoff from acid sulphate soils, acid mine drainage or any form of pH correction.

The invention provides apparatus for treating a substance, such as a body of water which has been affected by runoff from acid sulphate soils, to correct the pH level of said substance, characterized in that said apparatus includes a rotating drum adapted to tumble limestone rock to produce calcium carbonate particles from said rock, and in that means are provided to permit only those particles below a predetermined size to exit said drum for dosing of said substance.

The invention also provides a method of treating a substance, such as a body of water, having low pH and containing at least one metal in solution, said method including the steps of:

dosing said body of water with a first reagent until a first pH level is reached, resulting in said metal coming out of solution;

dosing said body of water with a second reagent until a second pH level is reached; and dosing said body of water with a third reagent until a third pH level is reached.

An embodiment of the invention will be described in detail hereinafter with reference to the accompanying drawings, in which.

Figure 1:
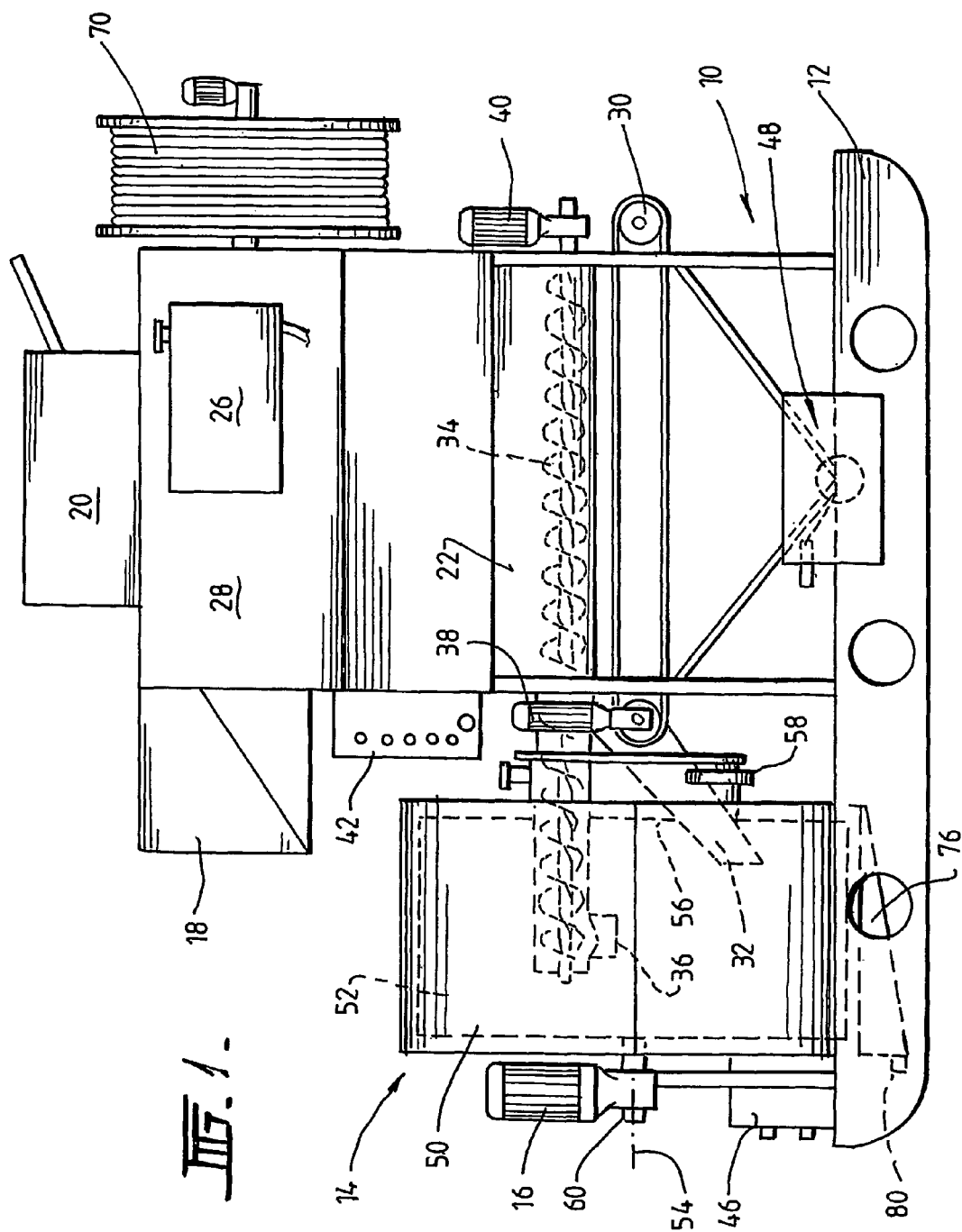
FIG. 1 is a side elevation of apparatus for treating a watercourse or waterway.

Before describing preferred embodiments of the present invention, it is to be understood that although such embodiments are described in relation to the treatment of bodies of water such as waterways and watercourses affected by ASS runoff, any substance may be treated. For example, treatment material produced by the methods and apparatus may be applied, for example by spraying, to quarry rock faces, excavations, building sites, road cuttings and disturbed soils in general, and pH correction in general may be effected.

Earlier in this specification the chemistry of acid sulphate soil runoff has been explained. In order to treat waterways and watercourses which have been subject to ASS runoff, it is not a simple matter of acid neutralization, returning the pH of the water to something approaching a pH of 7 by neutralizing the sulphuric acid in the runoff. It is necessary to treat the effluent water to neutralize metals such as iron, aluminium and arsenic. Whilst lime (calcium carbonate ($CaCO_3$)) is one reagent which is used in the treatment of ASS-affected waterways, other reagents may also be used, and the timing and amount of the use of reagents may also be important.

Aluminium goes into solution at a pH of 5.4, iron at a pH of 3.3, and arsenic at a pH of 8.2. It has been discovered that effluent water containing high aluminium loads and having a low pH such as 1.7 may best be treated by initial slow dosing with fine calcium carbonate. This dosing settles or flocks out the aluminium without significantly affecting the pH of the water. It is believed that the mechanism for settling out the aluminium is as follows.

The introduction of fine $CaCO_3$ particles into low pH effluent water produces an immediate increase in pH surrounding each particle. That precipitates aluminium, which adheres to the particle. It has been found that the finer the particle, the more efficient the settling result. A preferred particle size is less than 5 μm, although sizes up to 20 μm may be effective. The attraction of the aluminium to the particle of calcium carbonate continues until the particle is completely coated with aluminium. That "armours" the particle from further reaction, and in the process the particle becomes heavy and sinks to the bottom of the waterway. After the initial flocking or settling of aluminium, one or more further reagents, such as hydrated lime calcium hydroxide, with a high neutralizing factor, to treat the acidity in the effluent water.

An important factor to note, when dealing with pH correction, is that pH is not an accurate indicator of the amount of acidity or of the $H^+$ ion, merely an indication that $H^+$ is present. Iron and aluminium tend to mask the amount of $H^+$, and in fact release large quantities of $H^+$ in the process of coming out of solution. If calcium hydroxide ($Ca(OH)_2$) is injected directly into low pH effluent water with high metal loads, large clouds of "flok" (flocculation product) are produced. With the preferred method of the present invention, the initial addition of $CaCO_3$ to increase pH to about 3.3, is followed by the addition of another reagent, such as $Ca(OH)_2$ until the pH reaches approximately 5.5. Calcium carbonate may then again be added until the neutral pH of 7.0 is reached. With this method, an intense "flok" product may be avoided, and over-correction of the pH level cannot occur. This is vitally important in environmentally-sensitive locations such as estuaries and lakes.

Typical reagents used in dosing waterways and watercourse which are effected by ASS runoff are $CaCO_3$, $Ca(OH)_2$ and NaOH. $CaCO_3$ (neutralizing factor 8.8) is preferably provided in the form of particles, more preferably fine particles, more preferably produced in situ from limestone rock, as will be described hereinafter in this description. $Ca(OH)_2$ (neutralizing factor 12.4) may be supplied in powder form. NaOH (neutralizing factor 14.0) may be supplied in liquid form.

Apparatus which may be capable of performing the aforementioned method will now be described.

Figure 2:
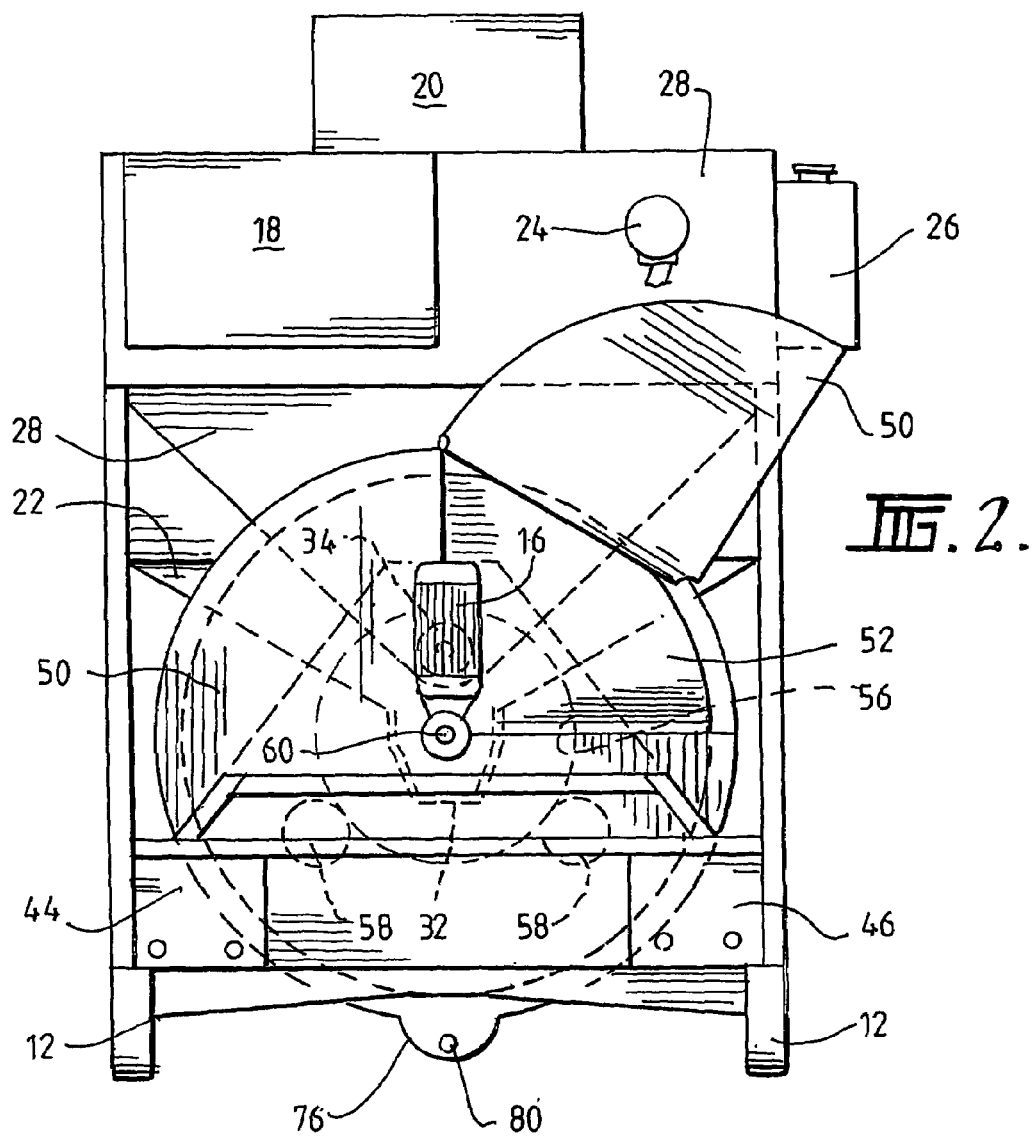
FIG. 2 is an end elevation of the apparatus of FIG. 1.

FIGS. 1 and 2 show an embodiment of a waterways lime spreader. The spreader 10 is shown in FIG. 1 mounted on a base 12. The spreader 10 may be mounted on a pontoon for location on the surface of a body of water, although it is to be understood that it could be mounted in any other manner. For example, the spreader may be located on a vehicle such as a truck, on a trailer, on a boat or barge, may be provided with a three-point linkage for attachment to a tractor, or may simply be located on the bank of a waterway, on a pier or jetty or the like. A pontoon-mounted arrangement is, however, most suitable for location in a waterway or watercourse.

The waterways lime spreader 10 includes a rotating drum arrangement 14 for producing $CaCO_3$ from limestone rock. Such rock (not shown) is tumbled in the arrangement 14, which abrades the rock to produce $CaCO_3$ particles. The drum 52 of the arrangement 14 is powered by a first motor 16. The motor 16 is preferably electric, and a generator 18 may be provided to supply power to motor 16 and other motors to be described later in this description. A rock hopper 22 supplies rock, in a manner to be described later in this specification, to tumbler 14.

Figure 7:
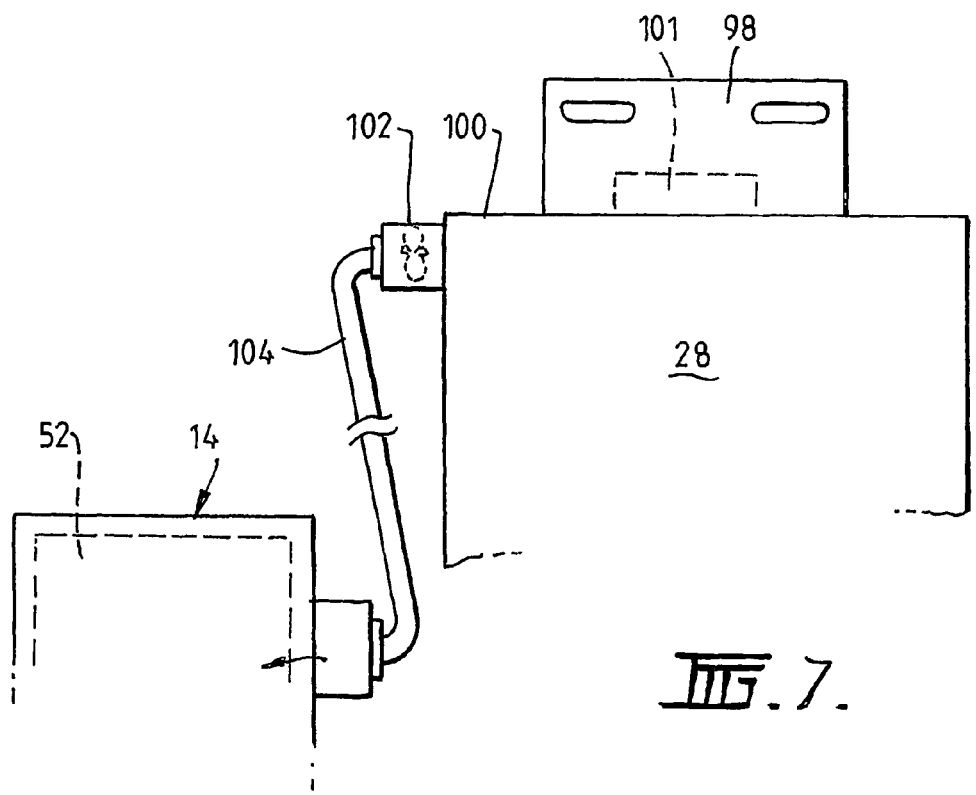
FIG. 7 is a diagrammatic side elevation of a dustless hopper filling system suitable for use in a waterways lime spreader of the type shown in FIGS. 1 and 2.

A hopper filling system 20 for supplying a reagent hopper 28 with powdered reagent is located at the top of the spreader 10. The filling system 20 has a dust extractor 24 (FIG. 2) which provides a dustless hopper filling system (FIG. 7). There is a liquid reagent tank 26 for reagents such as NaOH and a powder reagent hopper 28 for reagents such as $Ca(OH)_2$. Other reagents may be used: calcium oxide (CaO) and Bauxol (Trade Mark) are examples.

The spreader 10 also includes a conveyor 30, which transports rock reagent from rock hopper 22 to the inside of the rotating drum tumbler 14, through a discharge chute 32. There is also an auger 34 for the transport of powder reagent from hopper 28, the auger 34 supplying powder reagent to the rotating drum arrangement 14, delivering reagent to the interior of the drum at calibrated auger discharge point 36. Second motor 38 drives conveyor 30, and third motor 40, which may be a variable rpm motor, drives auger 34. A control panel 42 controls the operation of rotating drum tumbler 14, conveyor 30, and auger 34. An auto rewind hose reel 70 is also provided on the spreader 10.

The spreader 10 also features a primary pump 44 (FIG. 2) and a sludge pump 46. There is a water level control unit 48. The structure and use of these features will be described later in this specification.

The rotating drum tumbler arrangement 14 of waterways lime spreader 10 has an outer sump 50 which includes a cover. Within the sump 50 is located a round drum 52 which may have any suitable dimensions. However, good results have been achieved with a diameter of one meter and a width of 500 mm. This size of drum is basically governed by the magnitude of the application and is therefore relative. The drum 52 may be manufactured from mild steel, stainless steel, aluminium or extruded plastic. A prototype spreader has been fabricated from 4.5 mm mild steel plate.

The drum 52 is arranged to rotate about a generally horizontal axis 54, and has an unobstructed opening 56 made possible by the use of an external necklace style bearing 58, preferably made from mild steel and incorporating rollers made from polytetrafluoroethylene or high density rubber, with needle roller bearings.

The drum 52 has a fixed axle 60 at the end opposite that to accommodate the main support bearing and carry the drive from the drive motor 16. The drive motor 16 is preferably a variable speed motor, more preferably with a 68:1 reduction and more preferably having a power rating of 745.7 watts (1 horsepower). Rotational direction is preferably clockwise and revolutions per minute are preferably variable from 12 rpm to 33 rpm. At a rate of 15 rpm, production is 10% of rotating drum 52 capacity and at 33 rpm, production is 30% of drum 52 capacity. Production rates are also governed by the scale of hardness of the rock tumbled in the drum 52.

Figure 3:
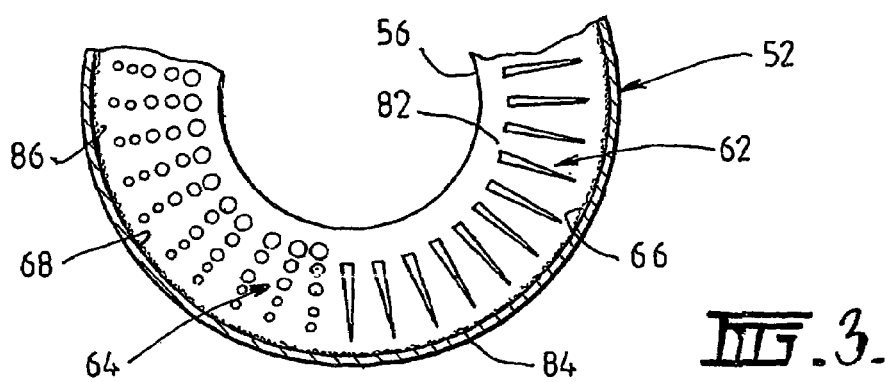
FIG. 3 is a partial cross-section through one form of drum for a rock tumbler used in said apparatus.

The ends (one of which is designated 84) of drum 52, near the outer portion thereof, are preferably provided with tapered diffuser slots 62 (FIG. 3) and/or with varying diffuser size apertures 64 (FIG. 3), which may preferably be small at the outer extremity and increasing in size towards the drum axis. The slots 62 or groups of apertures 64 may be radially spaced from each other. One preferred radial spacing is 5°: another is 8°. The outer extremities of the groups of diffuser holes 64 or slots 62 are preferably spaced from the outside of drum 52, as shown at 86. More preferably, they are positioned approximately 100 mm from the outside of the drum. This distance is important in that in that area is contained all uncrushed material above 20 µm, allowing only very fine particles of crushed material to be washed and diffused through the slots 62 or apertures 64 into the sump 50 or surrounding water. The inside surface of the cylindrical body 66 of drum 52 is provided with an abrasive lining 68. The prototype waterways lime spreader 10 successfully used 6 mm mild steel checker plate as the lining 68, with very little indicated wear. Other plate may be used, and other suitable material for the lining 68 may be Bisalloy, carborundum, hard facing material, or any wear material suitable for product to be crushed, abraded and/or ground.

It was initially believed that with limestone rock in the interior of drum 52, and with the drum 52 rotating, the rock is tumbled about the interior of the drum 52, contacting the abrasive surface 68, which causes the rock to abrade, producing calcium carbonate particles. These may then exit the drum 52 through the slots 62 or apertures 64 by being washed or diffused therethrough. The rock pieces fed into the drum 52 may be from 10 mm diameter to 150 mm or greater in diameter.

Subsequently, it was discovered that the only action of particle disintegration was not due to the abrasive contact of rock pieces 74 with abrasive surface 68. On close monitoring of the action of the rotating drum 52 it was found that the process is one of abrasion and crushing as a result of rock pieces 74 contacting each other as they are tumbled in the drum 52. In order to enhance that process, the arrangement of FIG. 4 was designed. In that diagrammatic sectional view along the axis of drum 52, guide vanes 72 are also provided on the interior surface of the body of the drum 52. The guide vanes 72 may have any desired shape, and are preferably arranged at an angle, which may more preferably be an acute angle, to the aforementioned interior surface. The vanes 72 act to deflect rock pieces 74, including sideways deflection, as they are tumbled in the drum 52, effectively increasing the distance each piece of rock travels with the confines of the drum 52, as shown by the arrows in FIG. 4.

Figure 4:
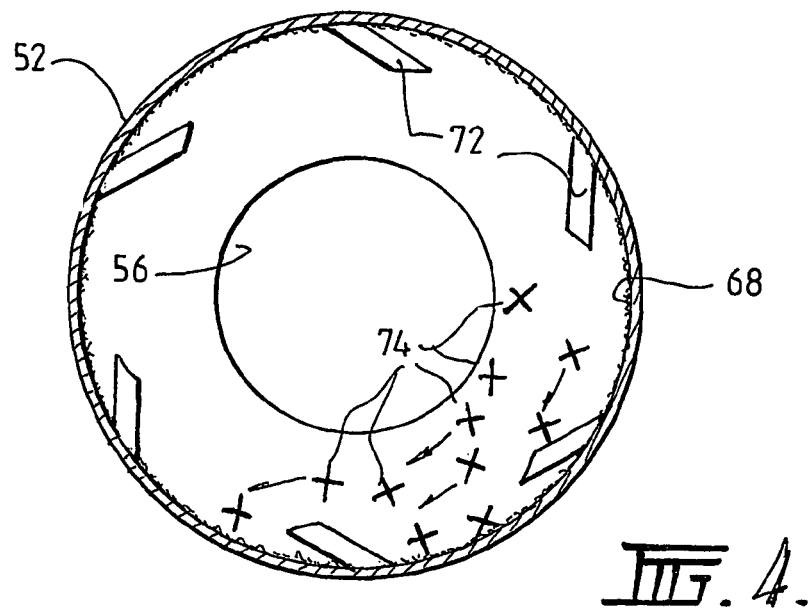
FIG. 4 is a diagrammatic cross-section through an alternative drum for a rock tumbler used in the apparatus.

With the arrangement of FIG. 4, no significant wear in the drum 52, resulting from contact between rock pieces 74 and the abrasive lining 68, has been noted. This is believed to be because each rock piece 74 remains stationery in contact with the abrasive lining 68m which may be in the form of abrasive pads. In this way, a piece of rock 74 is carried upwards by an abrasive pad 68 as the drum 52 rotates, after which it falls, under the influence of gravity, to contact other pieces of rock 74 in a highly agitated fashion, which action is enhanced by the guide vanes 72, which may impart a sideways motion to the rock pieces 74.

The method of filling and maintaining the working level of limestone rock material in the rotating drum 52 is by using the rock conveyor 30, which is preferably rubberised, and which is preferably built into the storage hopper 22. The control of the flow of material into the rotating drum 52 is achieved by using a torque load sensor (not shown) on the main drive motor 16, sequencing as follows:

Low torque demand sensed
Rock conveyor motor achieved
Material shifted from holding hopper 22 to rotating drum 52
Drive motor sensor, sensor increased torque loading
Pre-set torque level achieved and rock conveyor 30 switched off This process repeats itself until the rock hopper 22 is empty. When the drive motor 16 sensor senses low torque for longer than about two minutes, the waterways lime spreader 10 is completely switched off, indicating that the hopper 22 is empty.

Figure 5:
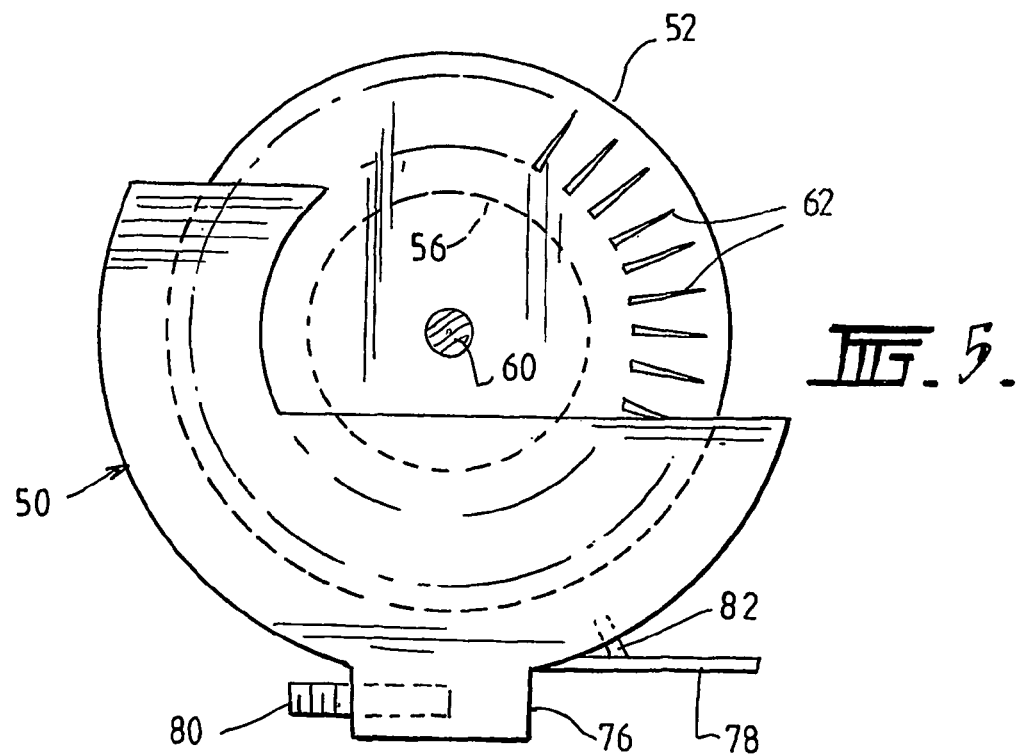
FIG. 5 is a diagrammatic end elevation of an embodiment of a rock tumbler suitable for use in a waterways lime spreader such as that of FIGS. 1 and 2.

The sump 50 (FIG. 5) is designed to fit around the bottom half of the rotating drum 52, and consists of three key components, a sump bottom 76, a product extractor venturi 78, and a sludge and by-product impurities screen 80, which latter item is preferably removable. A water inlet 82 is also shown in FIG. 5.

The role of the sump 50 is to collect water loaded with finely ground product. The product extractor venturi 78 uses bypass water from the main pump to 'suck' water laden with diffused particles, and discharges it directly into the waterway on or near which the spreader 10 is located. Any sludge and by-product impurities are collected in the sump bottom 76 and can be removed by removal of the screen 80, and cleaning.

The holding box or hopper 22 is preferably a standard box made from 3 mm mild steel plate. An exemplary waterways lime spreader 10 has a hopper with a one cubic meter capacity, with 30 degree tapering sides converging onto a chain and rubber belt conveyor 30 powered preferably by a 93.2 watts (⅛ horsepower), 60:1 reduction gearbox, providing 8 rpm. The conveyor motor 38 is activated by the previously-mentioned torque sensor associated with motor 16.

The specific role of the water pump 44 is to pump water into the rotating drum 52 at a rate of 2273.05 liters per hour (500 gallons per hour), creating a positive flow of ground product into the sump 50 via the diffuser ports 62, 64. The pump 44 has a capacity of 11,365.23 liters per hour (2500 gallons per hour). The excess water is diverted via a variable diverter valve to power the venturi 46 which in turn sucks the sump 50 (sump bottom 76) clean.

So far, basic features of the waterways lime spreader/active lime dispenser embodiment has been described. Further features of the apparatus 10 will now be described, as a result of major product development to enhance the capacity of the apparatus to treat effluent water using other, more 'potent' alkaline products, and to broaden the use of the apparatus to encompass such activities as remote drain spraying, remote hose spraying, mixing and blending of calibrated reagents, and operation with minimum supervision.

A preferred reagent proposed to be used in the modified apparatus 10 is hydrated lime, although the apparatus 10 still works equally well with rock limestone and its capacity to dispense fine lime ($CaCO_3$) using 150 mm rock not been compromised in any way.

It was desired to use preferred reagents such as Bauxol (Trade Mark), sodium hydroxide, calcium hydroxide, calcium oxide in the modified apparatus 10. Those reagents have pH neutralizing factors 30 to 40 times faster than $CaCO_3$, and there was a perceived need for blending reagents in some applications. These high neutralizing factors meant that there was a need for exact calibration to eliminate the possibility of over-correction of the pH level The active lime doser 10 was, as described earlier in this specification, originally designed to crush, grind and dispense $CaCO_3$ in the form of rock limestone of 100 mm to 150 mm aggregate into low pH water bodies. It was found that in a pH situation of less than 4, with acid up to 40 mgfP/l, and with the aluminium and/or iron present in solution was in excess of 400 mg/l, the amount of rock to be crushed and dispersed was far too uneconomical.

In its previously-described form, the active lime doser 10 was only capable of producing between 30 kg and 40 kg per hour of $CaCO_3$ from raw limestone rock. The high presence of Al, Fe and $H_2So4$ may have necessitated a rebuild of the tumbler 14 to a capacity of 1000 kg of aggregate, with a discharge rate of between 300 kg and 800 kg per hour of fine lime.

The modified active lime doser 10 is adapted to introduce into a body of water calibrated amounts of calcium hydroxide, until pH 5.5 has been achieved, whilst still applying $CaCO_3$, calcium hydroxide, calcium oxide, sodium hydroxide, Bauxol (trade mark), or a desired blend of those reagents. It is believed that this will result in the elimination of undesirable over-correction of the pH level, and will also provide huge cost savings in materials, labour, and machine wear and tear.

A sludge pump 46 is fitted to the active lime doser 10, to drain product from the sump bottom 76. The pump, preferably a 200 mono series pump, uses a positive displacement screw fitted inside a rubber membrane, producing a pressure of approximately 413.4 kPa (60 psi). In order to protect this pump from over-pressurization, a pressure relief valve is fitted, returning relief water to the sump 50.

The sludge pump 46 is also fitted with a water level pump fail safe system (not shown). This ensures that the sludge pump 46 does not run dry and will immediately shut the pump 46 down if water in the sump 50 falls below a safe level.

In order to generate effective priming of the sludge pump 46 a by-pass diverter valve (not shown) is installed on the active doser main pump 16, diverting medium pressure water into the sludge pump 46, thereby guaranteeing effective quick priming and reducing risk of dry running.

It was found that manually priming the active lime doser primary pump 16 was time consuming and sometimes hazardous to the operator, who had to bucket water from slippery and steep banks of waterways and watercourses. Accordingly, an integral pump primer arrangement was fitted to the active lime doser 10. A 20 liter container (not shown), adapted to contain water, is located on the side of the active lime doser 10, allowing water to be piped directly to the primer pump 16 via a ball valve, and then tapped directly into the impeller housing. In this way, greatly improving priming time is achieved.

One of the operating problems encountered whilst using the basic form of the active lime doser 10 was the constant vigilance required of the operator to maintain a static water level in the sump 50. Whilst using the sludge pump 46, a greater depth of water in the sump 50 was needed to facilitate the mixing of hydrated lime. This became, essentially, a two-man job, one to watch the remote spray hose, the other watching and maintaining the water level.

Figure 6:
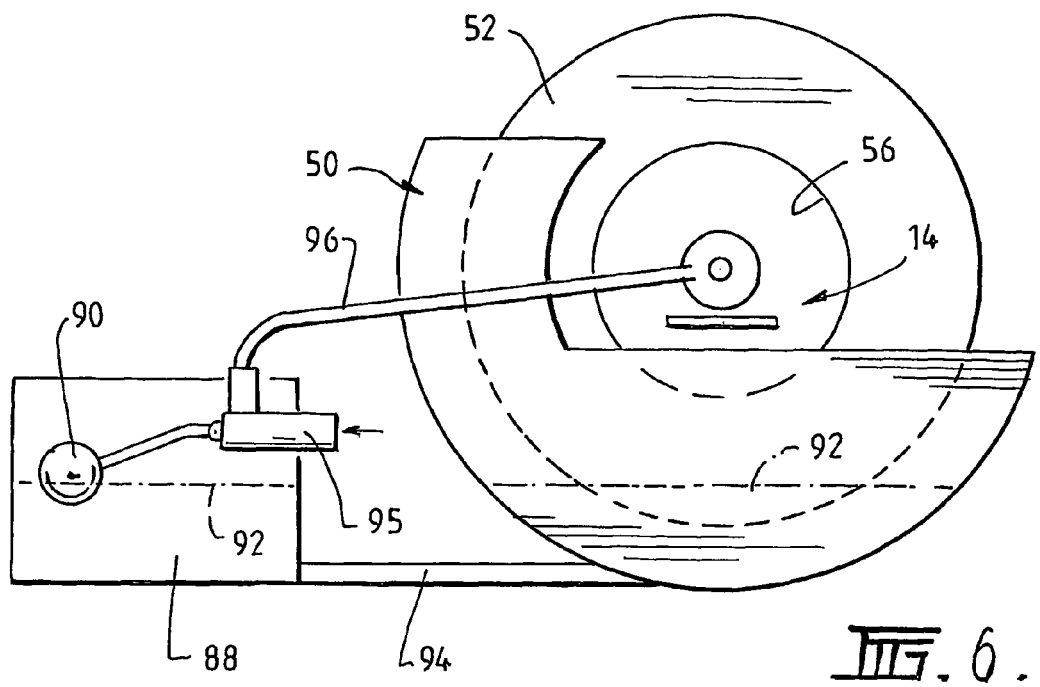
FIG. 6 is a diagrammatic side elevation of a water level control unit suitable for use in a waterways lime spreader of the type shown in FIGS. 1 and 2.

FIG. 6 shows, diagrammatically, an arrangement for overcoming this disadvantage. A 10 liter tank 88 is remotely connected by a 25 mm hose 94, acting as a water level balance tube, to the sump 50, relocating the water level in the sump 50. In the tank 88, a floating ball valve 90 is set to control the flow of water into the sump 50. The depth required in the sump 50 is easily controlled by moving the remote tank 88 up or down to preset the depth. Also shown is the sump water level (92), pump 16, and the water outlet 96 to the tumbler 14. This modification effectively made the machine a one man operation.

In order to attain maximum accuracy when applying highly reactive reagents, for example calcium hydroxide $(Ca(OH)_2$, a need for absolute variable control of the elevator feed belt was needed. A manual variator from 1 rpm to 10 rpm was fitted to the conveyor feed belt (30) drive motor 38, ensuring accurate calibration.

When using very fine powders it was noticed that the powder reagents, for example $(Ca(OH)_2$, had the ability to adhere to the surface of the feed belt 30. As a result, such powders were carried to other parts of the machine, and were deposited in undesirable places creating an undesirable cleaning and handling problem. Efficient scrapers (not shown) were fitted to the discharge part of the feed belt, eliminating undesirable carryover of reagent to other discharge points.

A large rubber shield (not shown) was fitted over the discharge chute 32 and extended into the tumbler drum 52. This effectively protects the discharge chute 32 from coming into contact with water which may be splashing around inside the tumbler 14 due to the tumblers working action. It was found that it is important to keep the discharge chute 32 as dry as possible because of the hydroscopic nature of the powdered reagents, causing them to become sticky in the discharge chute 32. With this modification, after the initial build-up there appeared to be no further restriction in performance.

To ensure an even feed from the hopper 22, a further rubber flap (not shown) was fitted to the discharge point of the elevator belt 30. This rubber flap is compressed down into the last 200 mm of the discharge point of the elevator belt 30. This creates an effective 'reed valve' which smoothes the flow of reagent powder to a 'specific thickness' and is also adjustable for 'desired thickness'. This is an important component for effective calibration of powdered reagent delivery, that is, with conveyor belt 30 speed equating to grams of delivery per minute.

The extremely alkaline nature of reagents such as calcium hydroxide and calcium oxide require that the operator of the active lime doser 10 be protected from such things as alkaline burns. Dust is created by the act of pouring reagent powder into the hopper 28. To effectively displace dust from the filling station 98 situated on the side of the powdered reagent hopper 28, it was decided to fit a dust-proof lid 100 to the hopper 28. Fitted to the hopper 28, preferably to the top of the lid, is a small filtered extractor fan 102. The fan 102 effectively creates a slight vacuum in the hopper 28. The slight vacuum in the hopper 28 effectively sucks dust back into the hopper 28. The filling station 98 is designed to minimize contact of an operator with reagent. A bag of reagent powder is loaded into the chemical bag cutter 102 located on the lid 100 of the hopper, where a remote bag opener is activated releasing the contents inside the hopper 28. The slight vacuum and enclosed bag opener minimize dust discharge. These modifications are designed to reduce operator risk but in no way stop sensible use of respirator, gloves and protective clothing. The lid 100 may be removed for the use of bulk bags of reagents. The top of the hopper 28 is correctly shaped to accept a bulk bag, effectively creating a seal with the bulk bag. Once again, a remote bag opener may be activated to release the contents of the bag.

The extractor fan 102 discharges into a water filter (not shown) which is drained through conduit 104 automatically into the sump 50 of active lime doser 10, through tumbler 14.

The use of liquid reagents such as sodium hydroxide requires extreme caution and exact calibration. In one embodiment the issue has been effectively addressed by fitting a 20 liter plastic tank (not shown) to the side of the liquid reagent hopper 26. The liquid reagent, calibrated as a liquid, for example 1 mol p/liter sodium hydroxide, is then introduced to the primary pump 16 via calibrated taps and injected into the impeller housing, ensuring complete mixing. This liquid reagent introduction system may be manufactured to relate to job size.

In order to ensure absolute accuracy with the calibration of reagent dosing, a number of influencing factors must be known. These factors include conveyor 30 belt speed (calibrated), auger (34) speed (calibrated), mixture ratio, water flow through the apparatus 10, and lab results from field samples.

The water flow through the machine is measured in liters per minute and the weight of reagent is measured in grams per minute, the resulting product is measured as grams per liter.

Figure 8:
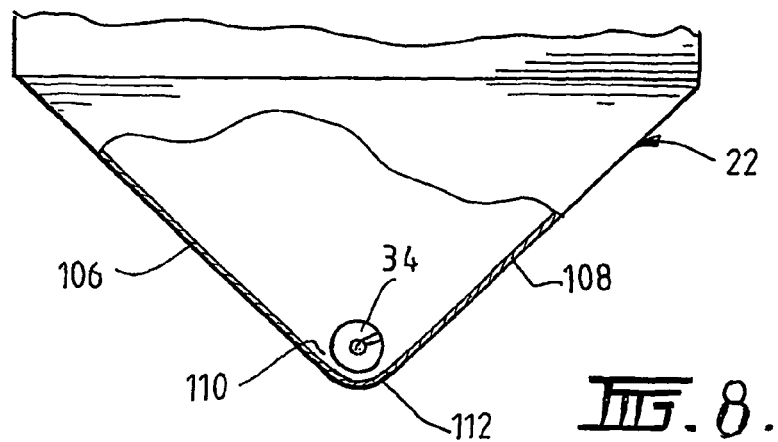
FIG. 8 is a diagrammatic end elevation of a calibrated powder reagent auger arrangement suitable for use in a waterways lime spreader of the type shown in FIGS. 1 and 2.
Figure 9:
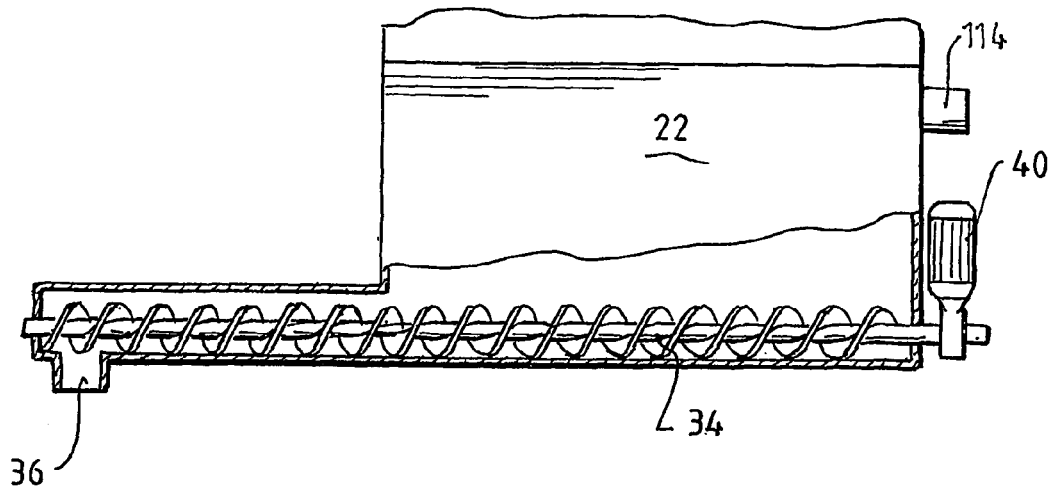
FIG. 9 is a side elevation of the arrangement of FIG. 8.

FIGS. 8 and 9 show an embodiment to enable the blending of alkaline reagents whilst maintaining absolute accuracy with calibration of extremely alkaline reactive agents in powder form.

To overcome the problems associated with 'bridging' (the tendency of powders which will resist flowing and tend to have an ability to span or 'bridge' from one point to another), the reagent powders hopper 22 has two sides 106, 108, which converge towards auger 34. Preferably, each wall 106, 108 is at an angle of approximately 45° to a vertical plane through the axis of auger 34. That would provide an angle of approximately 90° at the base 112 of the hopper 22. Preferably, a circle with the same axis as that of the auger, and approximately 10% greater than the diameter of the auger, would tangentially touch sides 106, 108. More preferably, the space 110 created by such an arrangement would be in the order of 5 mm of clearance between auger 34 flights and the base 112 of hopper 22. This is with preferred auger dimensions of 150 mm diameter, and a pitch of 150. The auger 34 is designed to remain unenclosed by an auger tube, which allows maximum contact with reagent material.

Although the design eliminates 'bridging' of reagent material over the auger 34, it was decided to position a single industrial vibrator 114 at the opposite end to the auger discharge point 36 on the outside of the hopper 22. These modifications to the hopper totally eliminated 'bridging' problems with powdered reactive agent and maintained calibrate ability of reagent.

A fail-safe shut-down system is also provided on the active lime doser 10 to shut down the doser 10 via the low oil pressure system, essentially shutting down the generator 18, therefore instantly shutting down all systems. The situations which may activate the fail safe system may include earth leakage on the electrical system, low water level in the sump 50, variator over-speed detected, or extreme alkalinity detected.

An air injection system may be incorporated in the active lime doser 10. Utilising Bernoulli's venturi principle, the venturi system allows for super-saturation of $O_2$ into discharge water, which allows for the replacement of $O_2$ which has been scavenged from the water due to monosulphide movement into the water profile. That is what occurred at Lismore, New South Wales, in 1994.

The active lime doser 10 was originally designed to use $CaCO_3$ in rock form, but has now had its unique capability enhanced to accommodate a multiple role by mixing calibrated amounts of reagents producing far better results in diverse acid discharge situations, whilst still using the $CaCO_3$ base reagent. The rock tumbler 14 has the unique ability to 'pound abrade', crush and completely mix reagents into a highly dispersible product to suit site specifics.

The waterways lime spreader 10 is designed to actively dose acid waterways with crushed calcium limestone thereby raising pH levels to an acceptable level. The combination of sound engineering principles has produced a unique machine for the safe and accurate dosing of problem areas associated with acid sulphate soils runoff.

The waterways lime spreader of this invention has been specifically designed to be environmentally friendly requiring very low power requirements using approximately 1,304.98 watts (1.75 horsepower) to carry out the full process.

Although a generator 18 has been preferred in described embodiments of the present invention for the supply of electrical power, other suitable power supplies include solar energy, wind power (both of which may involve battery storage, or battery storage per se could be used), mains power, a liquid propane gas internal combustion motor, a combination of solar/hydrogen/internal combustion or solar/hydrogen/bi-polar membrane.

It is considered that the waterways lime spreader of the present invention may be able to be left moored in a waterway or watercourse for lengths of time, with minimal monitoring required by an operator.

The invention claimed is:

1. An apparatus for treating a body of water with particles of calcium carbonate, said apparatus comprising:
    a drum having a first end wall and a second end wall, said first end wall having an opening into the interior of said drum,
    a drive motor adapted to rotate said drum about an axis,
    a conveyor for supplying said drum with limestone rock pieces,
    whereby the rotation of said drum by said drive motor causes said limestone rock pieces to be crushed, abraded or ground to produce calcium carbonate particles,
    a pump for supplying water to the interior of said drum,
    apertures in one or both of said first end wall and said second end wall, said apertures being dimensioned to permit the passage therethrough of particles that are only below a predetermined size,
    a sump located around a lower portion of the outside of said drum for receiving a mixture of water and said particles, that has passed through said apertures, and
    a venturi for sucking said mixture of water and said particles from said sump and discharging said mixture into said body of water.

2. The apparatus of claim 1, including a hopper for holding said limestone rock pieces and for discharging said pieces onto said conveyor.

3. The apparatus of claim 2, wherein the hopper can contain another reagent in powder form.

4. The apparatus according to claim 3, including transporting means for transporting said reagent in powder form from said hopper to the interior of said drum.

5. The apparatus according to claim 4, wherein said transporting means is an auger onto which said reagent in powder form is discharged by said hopper, said auger being positioned such that it extends through said opening to supply said reagent in powder form to the interior of said drum.

6. The apparatus according to claim 1, including a tank for containing a further reagent in liquid form, said tank discharging said reagent in liquid form into said pump for delivery with the water into the interior of said drum.

7. The apparatus according to claim 1, wherein outer extremities of said apertures are spaced from an outside of said drum in a radial direction such that an outer annular portion of said first end wall or of said second end wall does not contain any of said apertures.

8. The apparatus according to claim 1, wherein at least a part of the interior of said drum is provided with an abrasive lining.

9. The apparatus according to claim 8, wherein said abrasive lining is constituted by plates or pads.

10. The apparatus according to claim 1, wherein said predetermined size is 20 μm.

11. The apparatus according to claim 1, wherein said sump has a sump bottom provided with a removable by-product impurities screen.

12. The apparatus of claim 1, wherein the apertures are radial slots.

* * * * *